United States Patent
Yan

(10) Patent No.: US 10,612,221 B2
(45) Date of Patent: Apr. 7, 2020

(54) INTELLIGENT FAUCET STRUCTURE BASED ON PHOTOELECTRIC DETECTION DEVICE

(71) Applicant: Xiamen Forbetter Sanitary Ware Co., Ltd., Xiamen, Fujian (CN)

(72) Inventor: Xiliang Yan, Xiamen (CN)

(73) Assignee: XIAMEN FORBETTER SANITARY WARE CO., LTD., Xiamen, Fujian (CN)

( * ) Notice: Subject to any disclaimer, the term of this patent is extended or adjusted under 35 U.S.C. 154(b) by 92 days.

(21) Appl. No.: 15/961,882

(22) Filed: Apr. 25, 2018

(65) Prior Publication Data

US 2019/0328204 A1    Oct. 31, 2019

(51) Int. Cl.
| | | |
|---|---|---|
| G05D 7/06 | (2006.01) | |
| E03C 1/05 | (2006.01) | |
| B01F 3/08 | (2006.01) | |
| A47L 15/44 | (2006.01) | |
| A47L 15/00 | (2006.01) | |

(52) U.S. Cl.
CPC ............ *E03C 1/057* (2013.01); *A47L 15/449* (2013.01); *B01F 3/088* (2013.01); *G05D 7/0635* (2013.01); *A47L 15/0055* (2013.01)

(58) Field of Classification Search
CPC ...... F16K 31/605; F16K 19/006; F16K 31/05; G05D 7/0658; E03C 1/057; E03C 2001/0415; E03C 1/0404; E03C 1/055; Y10T 137/86823; Y10T 137/9464; Y10T 137/87579; Y10T 137/86815
See application file for complete search history.

(56) References Cited

U.S. PATENT DOCUMENTS

| | | | | |
|---|---|---|---|---|
| 5,167,255 A * | 12/1992 | Gohring | ................. | E03C 1/057 137/607 |
| 5,309,940 A * | 5/1994 | Delabie | .................... | E03C 1/057 137/607 |
| 6,854,658 B1 * | 2/2005 | Houghton | ........... | F16K 11/0746 137/625.41 |
| 8,403,005 B2 * | 3/2013 | Wang | ........................ | E03C 1/04 137/580 |
| 8,469,056 B2 * | 6/2013 | Marty | ................... | F16K 11/087 137/625.4 |
| 8,833,670 B2 * | 9/2014 | Chen | .................. | G05D 23/1393 137/625.41 |
| 8,939,429 B2 * | 1/2015 | Sawaski | .................. | E03C 1/057 251/129.04 |
| 9,062,790 B2 * | 6/2015 | Esche | ................. | F16K 37/0041 |

(Continued)

*Primary Examiner* — Seth W. MacKay-Smith
(74) *Attorney, Agent, or Firm* — Leong C. Lei

(57) ABSTRACT

An intelligent faucet structure based on a photoelectric detection device is disclosed. The intelligent faucet structure includes a faucet with a manual operation valve, an intelligent control module, a water outflow tube, a cold water inflow tube, a hot water inflow tube, and a photoelectric detection induction device. The water outflow tube, the cold water inflow tube and the hot water inflow tube are all connected to the manual operation valve that is mounted in the faucet. The intelligent control module is connected in series with the water outflow tube. The photoelectric detection induction device is installed on the water outflow tube and connected through a feeder cable or directly to the intelligent control module.

4 Claims, 6 Drawing Sheets

(56) References Cited

U.S. PATENT DOCUMENTS

| | | | |
|---|---|---|---|
| 9,074,698 B2 * | 7/2015 | Esche | F16K 37/0041 |
| 9,194,110 B2 * | 11/2015 | Frick | E03C 1/04 |
| 9,341,278 B2 * | 5/2016 | Esche | F16K 31/05 |
| 9,637,895 B2 * | 5/2017 | Song | E03C 1/057 |
| 9,656,280 B2 * | 5/2017 | Pitsch | B05B 1/169 |
| 10,036,148 B1 * | 7/2018 | Rodriguez | E03C 1/04 |
| 2014/0069520 A1 * | 3/2014 | Esche | E03C 1/0404 137/315.01 |
| 2017/0101766 A1 * | 4/2017 | Blizzard | E03C 1/055 |

* cited by examiner

INTELLIGENT FAUCET STRUCTURE BASED ON PHOTOELECTRIC DETECTION DEVICE

BACKGROUND OF THE INVENTION

1. Field of the Invention

The present invention relates to a faucet, and more particularly to an intelligent faucet structure based on a photoelectric detection device.

2. Description of the Prior Art

In general, a conventional countertop faucet is designed according to the appearance of the faucet and is generally mechanically operated with hands. The increasing emergence of electronic detective faucets in the market makes the automatic faucets a consequential choice. An automatic faucet detects the presence of a human body and acquires a signal that is transmitted subsequently to a control module so as to have power supplied from a power supply to a water supply system. The water supply system is thus enabled to control switching of water to supply water to the user. Such a conventional automatic faucet, including pull-out faucets, is generally controlled with a control module that acquires an opening/closing signal through an infrared sensor. Due to being of a unique feature, the conventional pull-out faucet, although generally arranged at a site around which use of water is necessary, allows a sprayer thereof to be pulled out in a condition of water being discharged to flush a distant site. Currently, no proposal has been made in this art for achieving the control of opening/closing the water supply through the movement of pulling out the sprayer. It is thus desired to provide a solution that achieves such a way of control.

SUMMARY OF THE INVENTION

The primary object of the present invention is to provide an intelligent faucet structure based on a photoelectric detection device that is used conveniently.

In order to achieve the aforesaid object, the intelligent faucet structure comprises a faucet with a manual operation valve, an intelligent control module, a water outflow tube, a cold water inflow tube, and a hot water inflow tube. The water outflow tube, the cold water inflow tube and the hot water inflow tube are all connected to the manual operation valve that is mounted inside the faucet. The intelligent control module is connected in series with the water outflow tube. The intelligent faucet structure further comprises a photoelectric detection induction device. The photoelectric detection induction device is installed on the water outflow tube and connected through a feeder cable or directly to the intelligent control module.

Preferably, the photoelectric detection induction device is composed of a photoelectric detection head and a transparent tube. The photoelectric detection head has an emitting part and a receiving part located at two sides of the water outflow tube, respectively. The transparent tube is connected in series in a middle of an opaque water tube and installed in a main body of the faucet.

Preferably, the photoelectric detection induction device is composed of a photoelectric detection head and a reflection device. The photoelectric detection head has an emitting part and a receiving part located at a same side of the water outflow tube. The reflection device is fixedly connected to the water outflow tube and installed in a main body of the faucet.

Preferably, the reflection device is a tube capable of reflecting light. The tube capable of reflecting light is connected in series with the water outflow tube.

Preferably, the intelligent faucet structure further comprises an infrared sensor. The infrared sensor is mounted to the faucet that is mounted on a countertop, and is connected through a feeder cable or directly to the intelligent control module.

With such a solution, the photoelectric detection device is installed on the water outflow tube. The photoelectric detection device is directly connected with the intelligent control module or connected with the intelligent control module through a feeder cable for sending a control signal to the intelligent control module to turn on/off the water flow of the faucet. Such an arrangement of controlling the water flow by pulling the water outflow tube makes the use easy.

DETAILED DESCRIPTION OF THE PREFERRED EMBODIMENTS

Embodiments of the present invention will now be described, by way of example only, with reference to the accompanying drawings.

Figure 1:
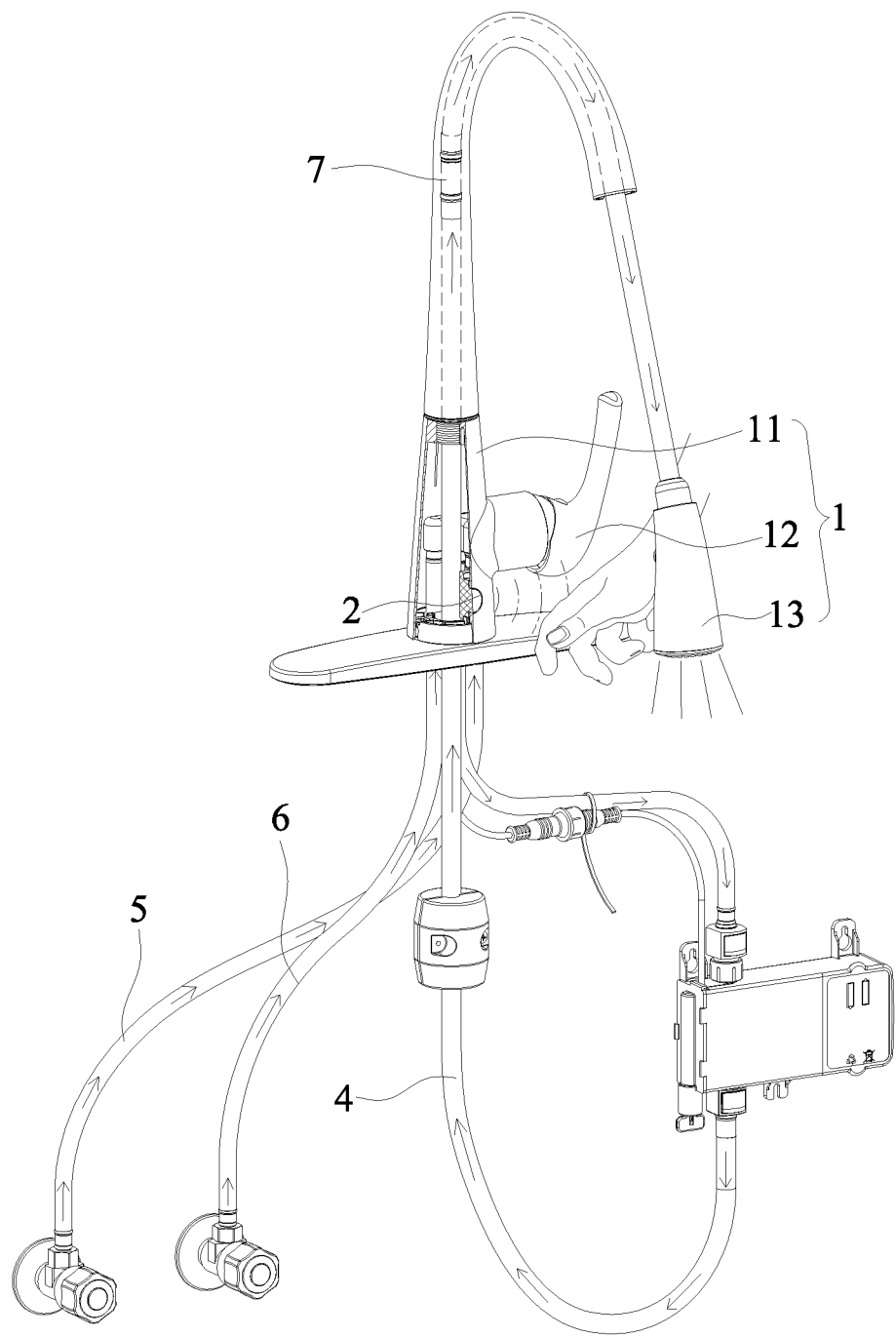
FIG. 1 is a perspective view of the present invention, wherein the sprayer is pulled outwards.
Figure 4:
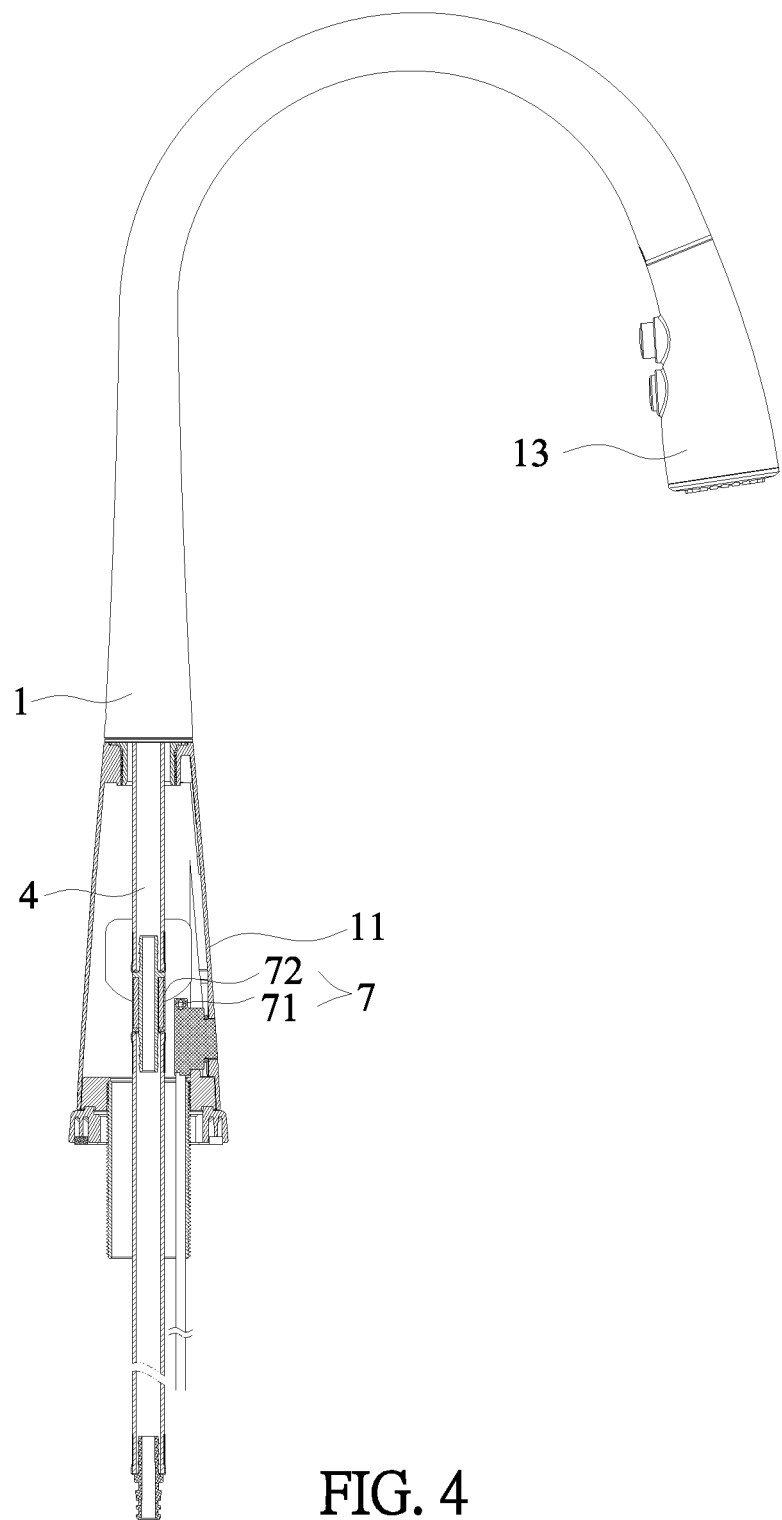
FIG. 4 is a cross-sectional view of the photoelectric detection device of the present invention.

As shown in FIG. 1 and FIG. 4, the present invention discloses an intelligent faucet structure based on a photoelectric detection device, which comprises a faucet 1 with a manual operation valve, an infrared sensor 2, an intelligent control module 3, a water outflow tube 4, a cold water inflow tube 5, a hot water inflow tube 6, and a photoelectric detection induction device 7.

The water outflow tube 4, the cold water inflow tube 5 and the hot water inflow tube 6 are all connected to the manual operation valve that is mounted inside the faucet 1. The intelligent control module 3 is connected in series with the water outflow tube 4.

Figure 5:
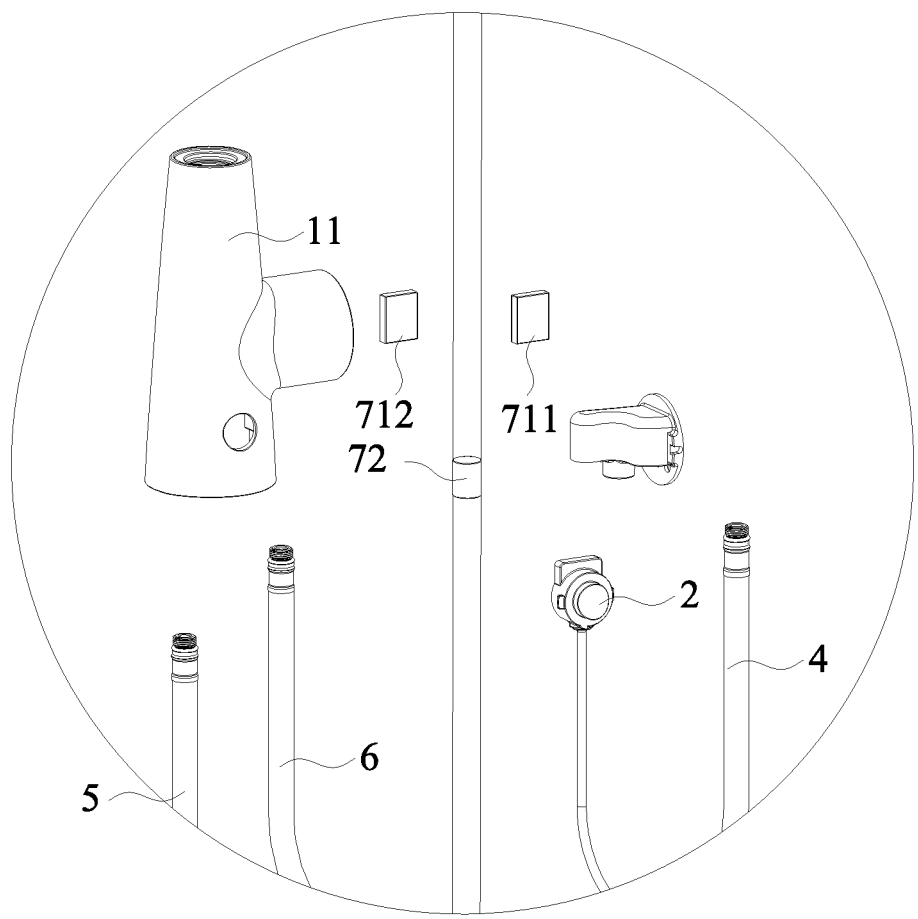
FIG. 5 is an exploded view showing a first example of the photoelectric detection device of the present invention.

FIG. 5 illustrates a first example of the photoelectric detection induction device 7 of the present invention. The photoelectric detection induction device 7 is composed of a photoelectric detection head 71 and a transparent tube 72. The transparent tube 72 is connected in series in the water outflow tube 4, that is, the transparent tube 72 is connected in series in the middle of the opaque water tube. The photoelectric detection head 71 is installed in a main body 11 of the faucet 1. The photoelectric detection head 71 has an emitting part 711 and a receiving part 712 located at two sides of the moving path of the water outflow tube 4, respectively. The light emitted from the emitting part 711 is received by the receiving part 712 through the transparent tube 72. After the transparent tube 72 is moved, the light emitted from the emitting part 711 is blocked by the opaque water tube. The receiving part 712 cannot receive the light. By moving the transparent tube 72, the receiving part 712 is controlled to receive or not to receive the light emitted from the emitting part 711. The photoelectric detection head 71 is connected to the intelligent control module 3 through a feeder cable.

Figure 6:
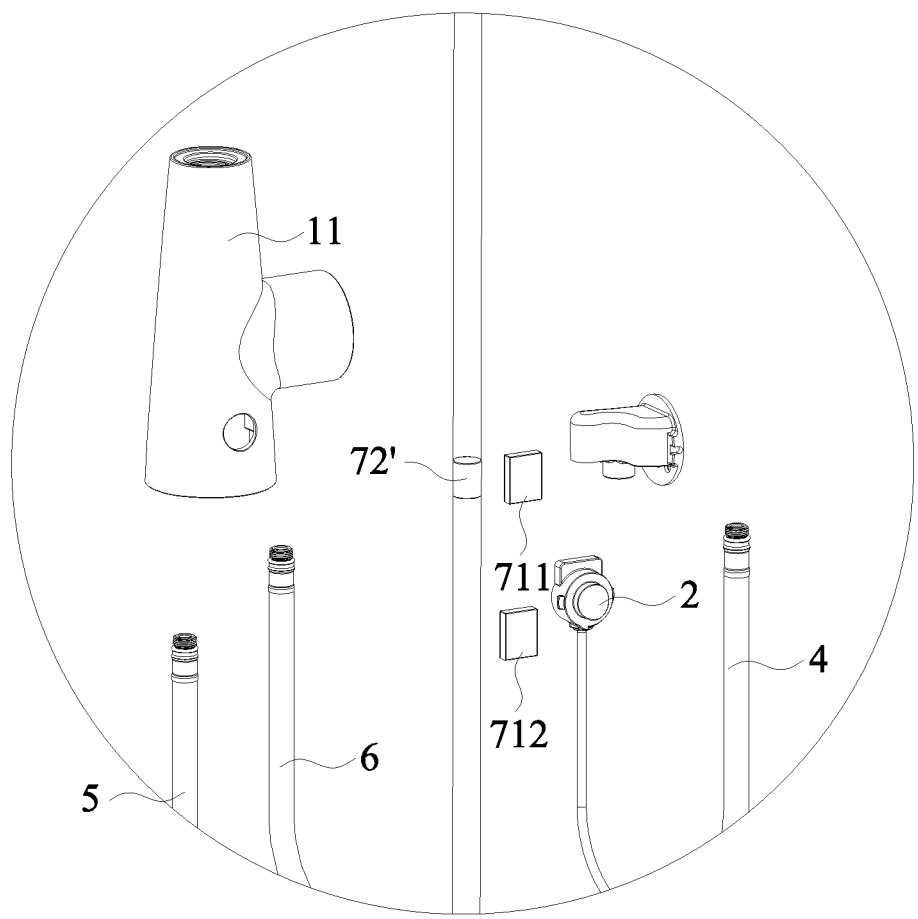
FIG. 6 is an exploded view showing a second example of the photoelectric detection device of the present invention.

FIG. 6 illustrates a second example of the photoelectric detection induction device 7 of the present invention. The photoelectric detection induction device 7 is composed of a photoelectric detection head 71 and a reflection device 72'. The reflection device 72' is fixedly connected to the water outflow tube 4. The photoelectric detection head 71 has an emitting part 711 and a receiving part 712 located at the same side of the water outflow tube 4. After the emitting part 711 emits an optical signal to be reflected by the reflecting part 72', the optical signal is received by the receiving part 712. After the reflection device 72' moves, the light emitted from the emitting part 711 cannot be reflected by the reflection device 72' and the light is not received by the receiving part 712. The reflection device 72' is a tube capable of reflecting light, which may be a tube coated with a reflective material or a tube made of a reflective material. The tube capable of reflecting light is connected in series in the middle of the water tube that cannot reflect light. The reflection device 72' may be a mirror or an aluminum plate fixed on the outer surface of the water outflow tube. The infrared sensor 2 is mounted to the faucet that is mounted on a countertop, and is connected with the intelligent control module 3 through a feeder cable.

The operation of the present invention is as follows:

The handle 12 of the faucet 1 is opened (the infrared sensor 2 is in a water shut-down condition), the sprayer 13 is pull downward so as to pull out the water outflow tube 4. The transparent tube 72 connected in series with the water outflow tube 4 is moved upward along with the water outflow tube 4 away from the photoelectric detection head 71 so that the photoelectric detection head 71 transmits an activation signal to the intelligent control module 3 (where the faucet 1 maintains in a condition of discharging water when the sprayer is pulled down in a condition when the faucet 1 is discharging water) and thus water is discharging from the faucet 1. Under this condition, the infrared sensor 2 on the faucet 1 is in a disabled condition. When a predetermined lapse of time reaches, the faucet 1 will shut down the water flow and the infrared sensor 2 will restore the sensing faction thereof. When it is necessary to have water discharged from the faucet 1, the infrared sensor 2 may be activated (where the function of the infrared sensor 2 for enabling water discharging may be restored back to the normal condition when a predetermined lapse of time is reached after water discharging enabled through pulling out is).

Figure 2:
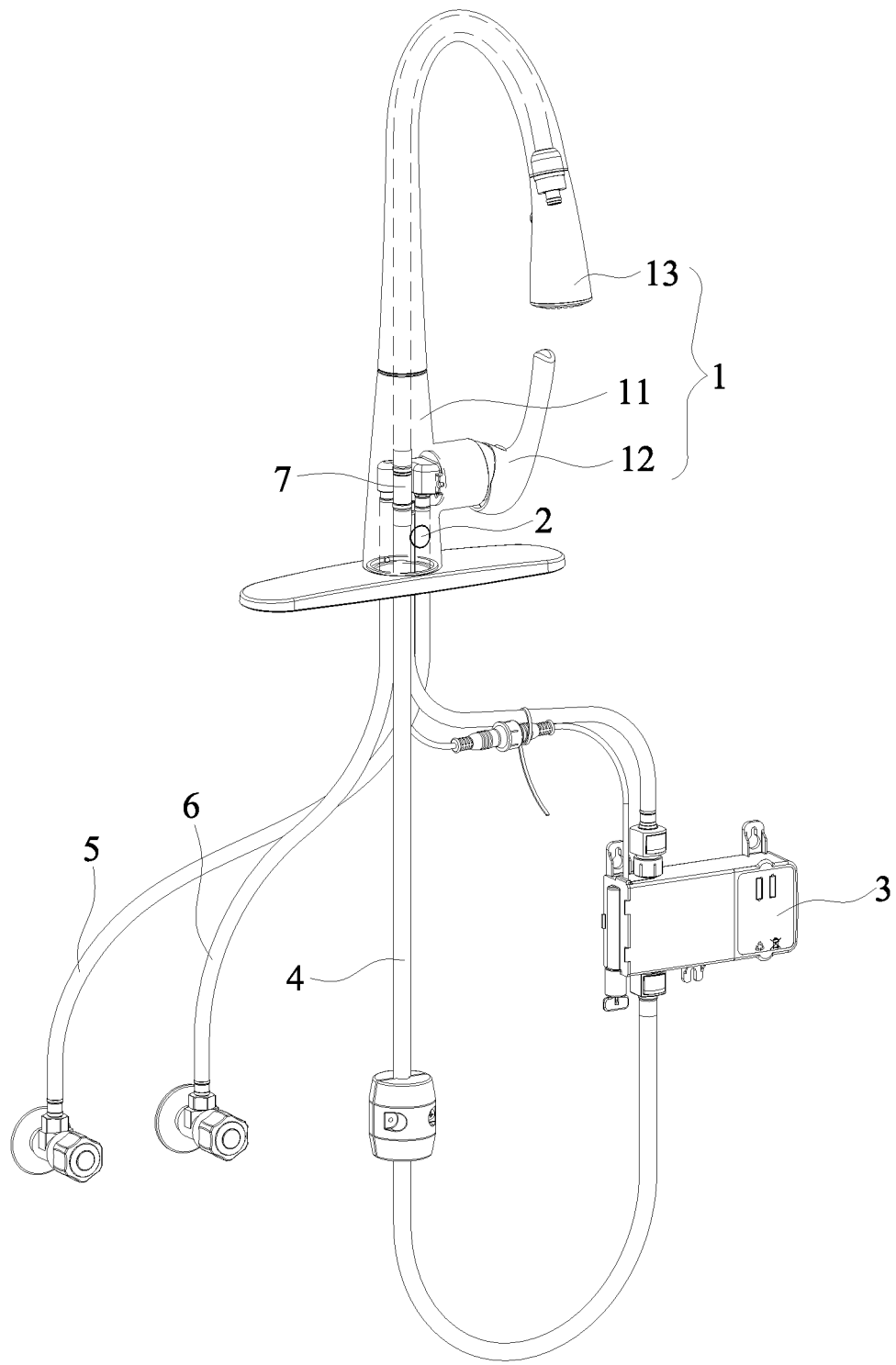
FIG. 2 is a perspective view of the present invention, wherein the sprayer is retracted.

As shown in FIG. 2, in a condition when the handle 12 is opened and water discharging activated through pulling out is enabled, when the sprayer 13 returns to the initial position, the faucet shuts down the water flow due to the operation of the photoelectric detection induction device 7.

Figure 3:
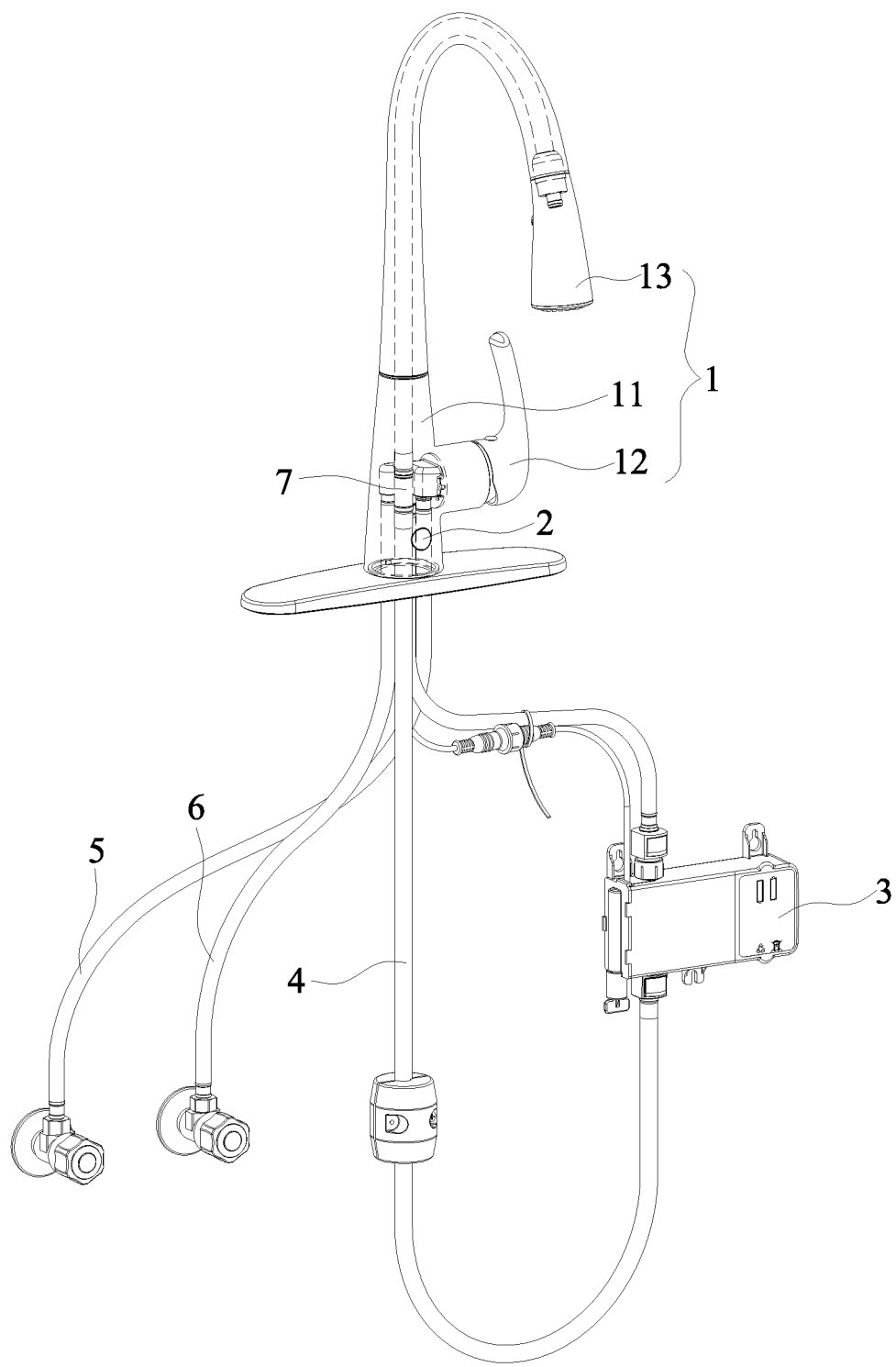
FIG. 3 is a perspective view of the present invention, wherein the handle is closed.

As shown in FIG. 3, when the faucet is in a condition of water discharging activated through sensing or water discharging activated through pulling out, the handle 12 can be closed to shut down the water flow.

In addition, the present invention may have the following modes of use:

The handle 12 is opened with the faucet 1 in a condition of not discharging water. After the infrared sensor 2 is activated, the faucet 1 discharges water. When a predetermined lapse of time reaches, the faucet 1 will shut down the water flow.

The handle 12 is opened with the faucet 1 in a condition of discharging water. The infrared sensor 2 is actuated again, and the faucet 1 shuts down the water flow, or after the handle 12 is closed, the faucet 1 shuts down the water flow.

An essential gist of the present invention is to control water discharging through a faucet with a photoelectric detection induction device.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An intelligent faucet structure, comprising a faucet with a manual operation valve, an intelligent control module, a water outflow tube, a cold water inflow tube and a hot water inflow tube; the water outflow tube, the cold water inflow tube and the hot water inflow tube being connected to the manual operation valve that is mounted inside the faucet; the intelligent control module being connected in series with the water outflow tube; characterized in that: the intelligent faucet structure further comprises a photoelectric detection induction device, the photoelectric detection induction device is installed on the water outflow tube and connected through a feeder cable or directly to the intelligent control module; wherein the photoelectric detection induction device is composed of a photoelectric detection head and a transparent tube, the photoelectric detection head has an emitting part and a receiving part located at two sides of the water outflow tube respectively, and the transparent tube is connected in series in a middle of an opaque water tube and installed in a main body of the faucet.

2. The intelligent faucet structure as claimed in claim 1, wherein the photoelectric detection induction device is composed of a photoelectric detection head and a reflection device, the photoelectric detection head has an emitting part and a receiving part located at a same side of the water outflow tube, and the reflection device is fixedly connected to the water outflow tube and installed in a main body of the faucet.

3. The intelligent faucet structure as claimed in claim 2, wherein the reflection device is a tube capable of reflecting light, and the tube capable of reflecting light is connected in series with the water outflow tube.

4. The intelligent faucet structure as claimed in claim 1, further comprising an infrared sensor, the infrared sensor being mounted to the faucet that is mounted on a countertop and is connected through a feeder cable or directly to the intelligent control module.

\* \* \* \* \*